United States Patent
Ernst et al.

(10) Patent No.: US 11,967,190 B2
(45) Date of Patent: Apr. 23, 2024

(54) METHOD FOR DETERMINING COMPONENT BEHAVIOR OF AT LEAST ONE VEHICLE COMPONENT OF A MOTOR VEHICLE, VEHICLE COMPONENT AND MOTOR VEHICLE

(71) Applicant: AUDI AG, Ingolstadt (DE)

(72) Inventors: Sebastian Ernst, Ingolstadt (DE); Steffen Baum, Ingolstadt (DE); Daniel Wesemeyer, Freystadt (DE)

(73) Assignee: AUDI AG, Ingolstadt (DE)

( * ) Notice: Subject to any disclaimer, the term of this patent is extended or adjusted under 35 U.S.C. 154(b) by 648 days.

(21) Appl. No.: 16/975,895

(22) PCT Filed: Jul. 1, 2019

(86) PCT No.: PCT/EP2019/067507
§ 371 (c)(1),
(2) Date: Aug. 26, 2020

(87) PCT Pub. No.: WO2020/007755
PCT Pub. Date: Jan. 9, 2020

(65) Prior Publication Data
US 2021/0005030 A1 Jan. 7, 2021

(30) Foreign Application Priority Data
Jul. 4, 2018 (DE) ...................... 10 2018 210 955.9

(51) Int. Cl.
*G07C 5/08* (2006.01)
*G06F 7/58* (2006.01)
(Continued)

(52) U.S. Cl.
CPC ............. *G07C 5/085* (2013.01); *G06F 7/588* (2013.01); *G06K 19/07758* (2013.01); *G07C 5/008* (2013.01); *G07C 5/0841* (2013.01)

(58) Field of Classification Search
None
See application file for complete search history.

(56) References Cited

U.S. PATENT DOCUMENTS

| 2015/0310742 A1 | 10/2015 | Albornoz |
| 2016/0021070 A1 | 1/2016 | Wagner |

FOREIGN PATENT DOCUMENTS

| CN | 101551670 A | 10/2009 |
| CN | 105511450 A | 4/2016 |

(Continued)

OTHER PUBLICATIONS

International Search Report and Written Opinion of the International Searching Authority directed to related International Patent Application No. PCT/EP2019/067507, dated Sep. 27, 2019, with attached English-language translation; 26 pages.
(Continued)

*Primary Examiner* — Abdhesh K Jha
(74) *Attorney, Agent, or Firm* — Sterne, Kessler, Goldstein & Fox P.L.L.C.

(57) ABSTRACT

This disclosure relates to a method for determining a component behavior of at least one vehicle component of a motor vehicle. A start-up of the at least one vehicle component of the motor vehicle for the first time is registered. Thereafter, a component identifier is created, which is assigned to the registered vehicle component. The component identifier includes a sequence of a predetermined number of characters, each character being generated by a random generator. Furthermore, operating data of the vehicle component in question are collected, which are assigned to the component identifier assigned to the vehicle component in question. The component behavior of the vehicle component in question is determined on the basis of the operating data assigned to the component identifier in
(Continued)

question. This disclosure further relates to the vehicle component and to a motor vehicle having one or more vehicle components of this type.

10 Claims, 2 Drawing Sheets

(51) Int. Cl.
*G06K 19/077* (2006.01)
*G07C 5/00* (2006.01)

(56) References Cited

FOREIGN PATENT DOCUMENTS

| | | |
|---|---|---|
| CN | 105835773 A | 8/2016 |
| DE | 10020977 A1 | 10/2001 |
| DE | 102006030046 A1 | 1/2008 |
| DE | 102008032094 A1 | 1/2010 |
| DE | 10 2011 017 590 A1 | 11/2011 |
| DE | 102013220453 A1 | 4/2015 |
| EP | 2026311 A1 | 2/2009 |
| EP | 2912856 A1 | 9/2015 |

OTHER PUBLICATIONS

International Preliminary Report on Patentability directed to related International Patent Application No. PCT/EP2019/067507, completed Jun. 9, 2020, with attached English-language translation; 14 pages.

METHOD FOR DETERMINING COMPONENT BEHAVIOR OF AT LEAST ONE VEHICLE COMPONENT OF A MOTOR VEHICLE, VEHICLE COMPONENT AND MOTOR VEHICLE

TECHNICAL FIELD

The present disclosure relates to a method for determining a component behavior of at least one vehicle component of a motor vehicle. Furthermore, the present disclosure relates to a vehicle component for a motor vehicle and a motor vehicle.

BACKGROUND

It is known to record vehicle data in a vehicle, for example, operating data of a vehicle component, and to use them for an evaluation or for a design of a behavior of the vehicle component in a real vehicle usage environment. The evaluation or the design can be carried out outside the vehicle, for example by an external server device. For this purpose, vehicle-external databases are created having the recorded vehicle data.

In the current legal situation, the vehicle data in the vehicle-external database may only be collected anonymously. Thus, no reference to a specific person or to a specific vehicle, for example by a specific chassis number or a specific serial number, may be created via the stored data.

In order to make the data collection anonymous, it is known, for example, to use a time-varying identifier which changes after a predetermined period of time. The vehicle data are then collected in relation to the changing identifier. Thus, only data within a time window, before the predetermined period of time has expired, can be assigned to one another. However, it is not possible to establish any relation between a first data set stored with a first identifier and a second data set stored with a second identifier, even if the two data sets are associated with a same vehicle component. Thus, valuable information can be lost during the evaluation of vehicle data, for example, the behavior of the vehicle component over a longer period of time.

In this context, DE 10 2006 030 046 A1 describes a method for monitoring and managing components and component-related information for components of a powertrain of a motor vehicle. For this purpose, an identification feature, for example, a so-called RFID sticker is inserted into the component to be monitored. After the component has been installed in the vehicle, a vehicle electronics recognizes the identification feature, for example, via an RFID antenna. Thus, data to be monitored are stored together with this identification feature.

From DE 10 2013 220 453 A1, a method for operating a motor vehicle is further known, in which during an operating time of the motor vehicle a temporal course of an operating parameter in a detection period is detected. The temporal course detected is sent with an identification, which uniquely identifies a vehicle type and/or a vehicle component type.

From DE 10 2008 032 094 A1 a method for component detection by a vehicle is known. For this purpose, a plurality of vehicle components having self-identification data are arranged in a vehicle. The vehicle components are equipped with a so-called RFID circuit. A central controller of the vehicle is configured to detect, permanently store and make the self-identification data of the vehicle components available for servicing and maintenance.

The disadvantage of the aforementioned methods is that a complete anonymous data acquisition cannot be guaranteed. For example, it is possible to create an assignment of the RFID sticker to the vehicle component and to a specific vehicle by installing the vehicle component. The detection of vehicle data thus no longer threatens to be anonymous.

BRIEF DESCRIPTION OF DRAWINGS/FIGURES

DETAILED DESCRIPTION

Figure 1:
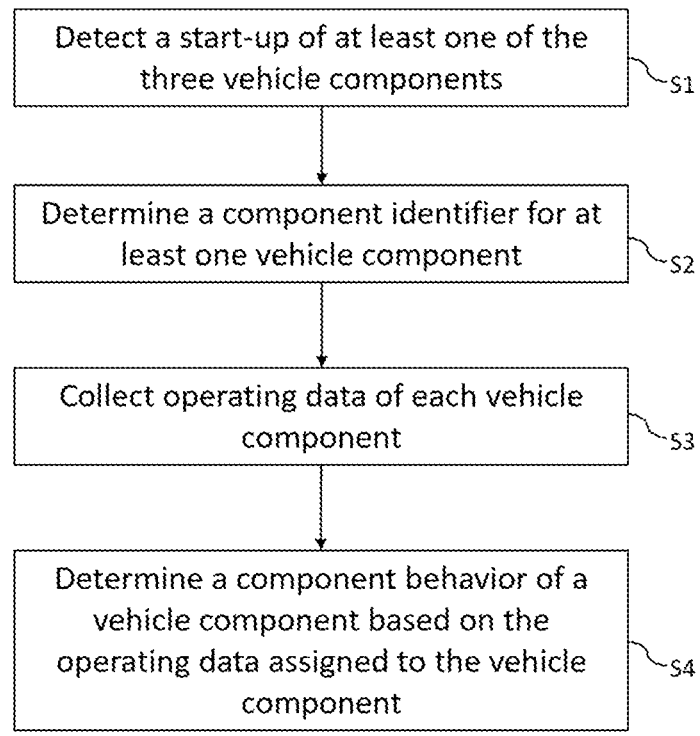
FIG. 1 shows a diagram, which schematically shows the method steps for a method for determining a component behavior of at least one vehicle component of a motor vehicle, in accordance with some embodiments.

The object of the present disclosure is to provide a method which enables anonymous data acquisition of collected data of a vehicle component arranged in the motor vehicle, by means of which anonymous data analysis of the collected data can be performed.

This object is solved by the subject matter of the independent claims. Advantageous further developments of the present disclosure includes subclaims, the following description and the figures.

The present disclosure is based on operating data of a vehicle component of a motor vehicle that is detected anonymously, particularly if an identifier is assigned to the vehicle component, which is randomly selected and generated in a vehicle-internal manner for the first time. Thus, the identifier cannot be known outside a motor vehicle-internal control system.

In some embodiments, to enable anonymous data acquisition of vehicle component-related data in the motor vehicle, the method described in the following is created. The method for determining a component behavior of at least one vehicle component of a motor vehicle provides in a first method step that a start-up of the at least one vehicle component of the motor vehicle is detected for the first time. A start-up can occur when the respective vehicle component is switched on and/or controlled for the first time. This can be done promptly after the installation of the vehicle component in the motor vehicle, for example, as soon as a production of the motor vehicle is completed. However, a start-up can also only occur when a predetermined period of time has elapsed after completing the production of the motor vehicle. For example, the predetermined period of time is at least 10 hours or at least 24 hours. The at least one vehicle component may, for example, be designed as a controller or as a power electronic apparatus of the motor vehicle.

In a second method step, a component identifier assigned to the respective vehicle component is created after the detection of the start-up of the respective vehicle component for the first time. The detection of the start-up for the first time can trigger the creation of the component identifier. The component identifier comprises a sequence of a predetermined number of characters, each character being generated by a random generator. The identifier, for example, can be a code or an identification number. The characters may be designed as written characters, numeric characters, special characters, a combination of the aforementioned characters. The component identifier can then be designed, for example, as a sequence of a predetermined number of random numbers. For this purpose, the respective vehicle component may have its own random generator or a central vehicle-internal random generator may be provided in the motor vehicle.

In some embodiments, the predetermined number of characters may be chosen in such a manner that the probability of the same component identifier being generated twice independently of the respective vehicle component and/or motor vehicle is very small. For example, the predetermined number of characters is at least 15. However, the predetermined number of characters may alternatively be chosen in such a manner that the probability of the same component identifier being allocated to two different vehicle components is significant in such a manner that retrospectively it cannot be clearly determined to which motor vehicle and/or vehicle component the component identifier is allocated. The required probability and the resulting number of characters can be determined from indications from the current legal situation.

In a further method step, operating data of the respective vehicle component are collected. For this purpose, at least one predetermined measurement parameter can be measured by an appropriate measuring apparatus. For example, a usage behavior and/or an operating temperature and/or an operating performance of the respective component are registered by the operating data. The operating data can be registered in real time over the duration of an operation of the vehicle component. The collected operating data can be stored or cached in a vehicle-internal storage apparatus. The collected operating data of the respective vehicle component are assigned to the component identifier of the respective vehicle component. For example, the collected operating data are stored together with the assigned component identifier.

In a further method step, the component behavior of the respective vehicle component is determined based on the operating data assigned to the respective component identifier. For this purpose, an evaluation apparatus may be provided in a vehicle-external manner, designed, for example, as a central server apparatus. The collected operating data are then sent together with the assigned component identifier to the central server apparatus. It is particularly intended that, when sending the collected operating data of the respective vehicle component together with a specific identifier of the respective vehicle component to the vehicle-external server apparatus, exclusively the component identifier assigned to the respective vehicle component is used as the specific identifier.

In some embodiments, the central server apparatus may include a database in which the sent operating data are stored together with the assigned component identifier. The vehicle-internal collected operating data of the respective vehicle component can be sent to the central server apparatus at predetermined times or at predetermined time intervals. The central server apparatus can also receive operating data having respective component identifiers from further vehicle components of the same motor vehicle and/or of a further motor vehicle. For determining the component behavior, those operating data, which have the same identifier are assigned to one another in the evaluating apparatus.

In some embodiments, an operating performance and/or an operating condition and/or a usage pattern and/or a usage behavior of the respective vehicle component of the motor vehicle can be determined as component behavior. For example, a requirement specification of the vehicle component can be optimized therefrom and/or a predictive damage recognition of the vehicle component can be determined.

In some embodiments, the method may allow that the vehicle-external stored operating data are acquired anonymously, since an assignment of the operating data to a specific motor vehicle or to a specific user of the motor vehicle is prevented. Since only a component identifier generated by a random generator after installation of the vehicle component is communicated in a vehicle-external manner, the origin of the assigned operating data cannot be traced back to a specific motor vehicle or a specific vehicle component. However, assignments of individual data sets of the operating data to one another can be carried out, even if the individual data sets were acquired at different points in time. This has the advantage that, overall; an anonymous data analysis of vehicle-internal acquired data is made possible.

The present disclosure also includes various combinations of the features according to various embodiments.

In some embodiments, the component identifier of a respective vehicle component remains assigned to the respective vehicle component unchanged, independently of any further start-up of the respective vehicle component. The component identifier can then particularly remain assigned to the respective vehicle component throughout the entire lifespan thereof. This means that a component identifier is created once for the respective vehicle component. In this manner, it can be ensured that operating data collected over long periods of time, for example over a plurality of months and/or a plurality of years, can be assigned to one another. Thus, the component behavior of the respective vehicle component can be analyzed in an advantageous manner over a long period of time and, for example, a threatening deterioration in component performance can be established.

In some embodiments, the method may include generation of a motor vehicle identifier assigned to the motor vehicle according to the start-up for the first time of the respective vehicle component of the motor vehicle. The motor vehicle identifier includes a sequence of a predetermined number of characters, which are generated by the random generator. The characters may, like the characters of the component identifier, be designed as written characters, numeric characters, special characters, or a combination of the aforementioned characters.

In some embodiments, all operating data of the vehicle components arranged in the motor vehicle are assigned to the motor vehicle identifier. Thus, a data record of the operating data may comprise a specific assigned component identifier as well as the assigned motor vehicle identifier. In a further method step, the component behavior is further determined based on the operating data assigned to the respective motor vehicle identifier. If a plurality of vehicle components are mounted in the motor vehicle, the component behavior of an individual vehicle component can be determined by means of operating data of the further vehicle components of the motor vehicle. A conjunction of individual data sets of the different vehicle components of the motor vehicle is therefore possible, for example in the central server apparatus. Accordingly, the acquisition of operating data is still anonymous, since no reference can be made to a chassis number or a serial number of the motor vehicle.

In some embodiments, the vehicle identifier remains assigned in an unchanged manner to the motor vehicle, independently of a start-up of a further vehicle component and/or independently of turning off of the motor vehicle and/or independently of a repeated start-up of the motor vehicle. Particularly, the vehicle identifier is assigned to the motor vehicle in an unchanged manner over the entire lifespan of the motor vehicle. This means that the motor vehicle identifier is created once. The single creation of the motor vehicle identifier may occur through the start-up of the motor vehicle for the first time and/or through the start-up of a first vehicle component of the motor vehicle for the first time. Thus, a determination of a component behavior of a vehicle component in relation to the same motor vehicle can be carried out in an advantageous manner, independent of the installation and/or dismantling of further vehicle components of the motor vehicle. In particular, if the vehicle component is replaced, a component behavior of the newly installed vehicle component in relation to the same motor vehicle can then be determined.

In some embodiments, the motor vehicle identifier is newly created with each start-up of a further vehicle component for the first time. This means that with each new configuration of vehicle components of a motor vehicle, the identifier is newly created. The motor vehicle identifier thus changes with each installation and/or dismantling of a vehicle component of the motor vehicle. Thus, it is possible to determine a component behavior of a vehicle component in relation to a vehicle configuration of the motor vehicle.

In some embodiments, the vehicle component of a motor vehicle is configured to register a start-up of the vehicle component for the first time. For this purpose, the vehicle component may have a detection apparatus. The vehicle component is also configured to create a component identifier comprising a predetermined number of characters. For this purpose, the vehicle component has a random generator configured to generate each character of the component identifier. The vehicle component is further configured to register operating data of the vehicle component and to assign the registered operating data to the created component identifier.

In some embodiments, the vehicle component may include a sending apparatus configured to exclusively use the assigned component identifier as the specific identifier when sending operating data together with a specific identifier of the vehicle component. Thus, sending a non-anonymous identifier can be excluded.

The present disclosure also encompasses further developments of the vehicle component, which have features as previously described in conjunction with the further developments of the method according to various embodiments, as described herein. For this reason, the corresponding further developments of the vehicle component are not described again here.

The motor vehicle according to some embodiments may include the vehicle component or a plurality of vehicle components, as described herein.

The present disclosure also encompasses further developments of the motor vehicle, which have features as previously described in conjunction with the further developments of the method according to some embodiments and with the further developments of the vehicle component according to some embodiments. For this reason, the corresponding further developments of the motor vehicle according to various embodiments, as described herein, are not described again here.

In the embodiments, the described components of the embodiments each represent individual features that are to be considered to be independent of one another and in combinations of the features of the embodiments than the ones presented. Furthermore, the described embodiments may also be supplemented by further features, described herein.

In the figures, the same reference signs refer to functionally identical elements.

FIG. 1 shows a diagram, which schematically shows the method steps for a method for determining a component behavior of at least one vehicle component of a motor vehicle, in accordance with some embodiments.

Figure 2:
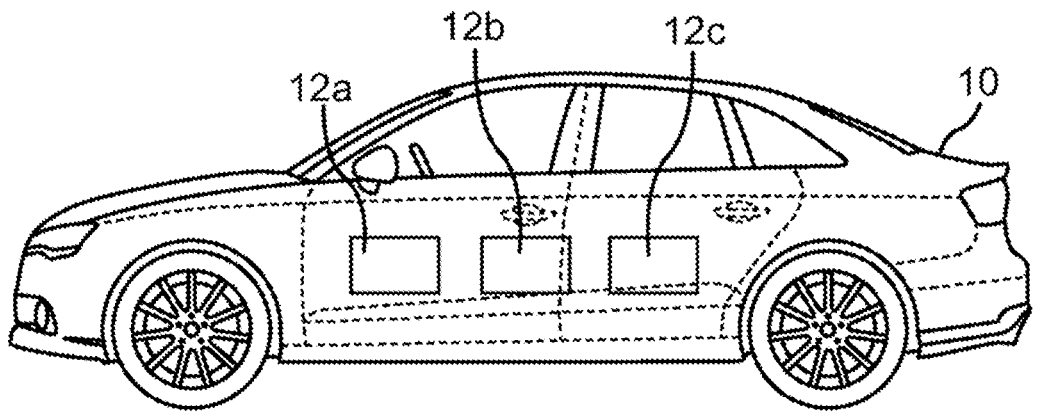
FIG. 2 shows a schematic representation of a motor vehicle having three vehicle components, in accordance with some embodiments.

FIG. 2 shows a schematic representation of a motor vehicle having three vehicle components, in accordance with some embodiments. In FIG. 2 the motor vehicle 10 is shown in a schematic manner. The motor vehicle 10 has three presented vehicle components 12a, 12b and 12c. However, the motor vehicle 10 may have only one or a plurality of vehicle components. At least one of the vehicle components 12a, 12b, 12c may be designed as a controller and/or as a power electronics apparatus and/or as a drive component of the motor vehicle 10. Using the method shown in FIG. 1, operating data of the individual vehicle components 12a, 12b, 12c are detected in the motor vehicle 10 and provided for a vehicle-external evaluation. The motor vehicle 10 or the individual vehicle components 12a, 12b, 12c are configured to create a communication connection with a central server apparatus and to send the registered operating data of the individual vehicle components 12a, 12b, 12c via this communication connection. The vehicle-external server apparatus determines a respective component behavior of the individual vehicle components 12a, 12b, 12c of the motor vehicle 10 by means of the operating data. The vehicle-external server apparatus can also receive operating data from further motor vehicles and determine the respective component behavior from vehicle components of these further motor vehicles. A component behavior can be, for example, a component performance or a usage behavior of the vehicle component 12a, 12b, 12c. For this purpose, an operational pattern and/or a usage pattern of the individual vehicle component 12a, 12b, 12c can be determined by means of the operating data.

Figure 3:
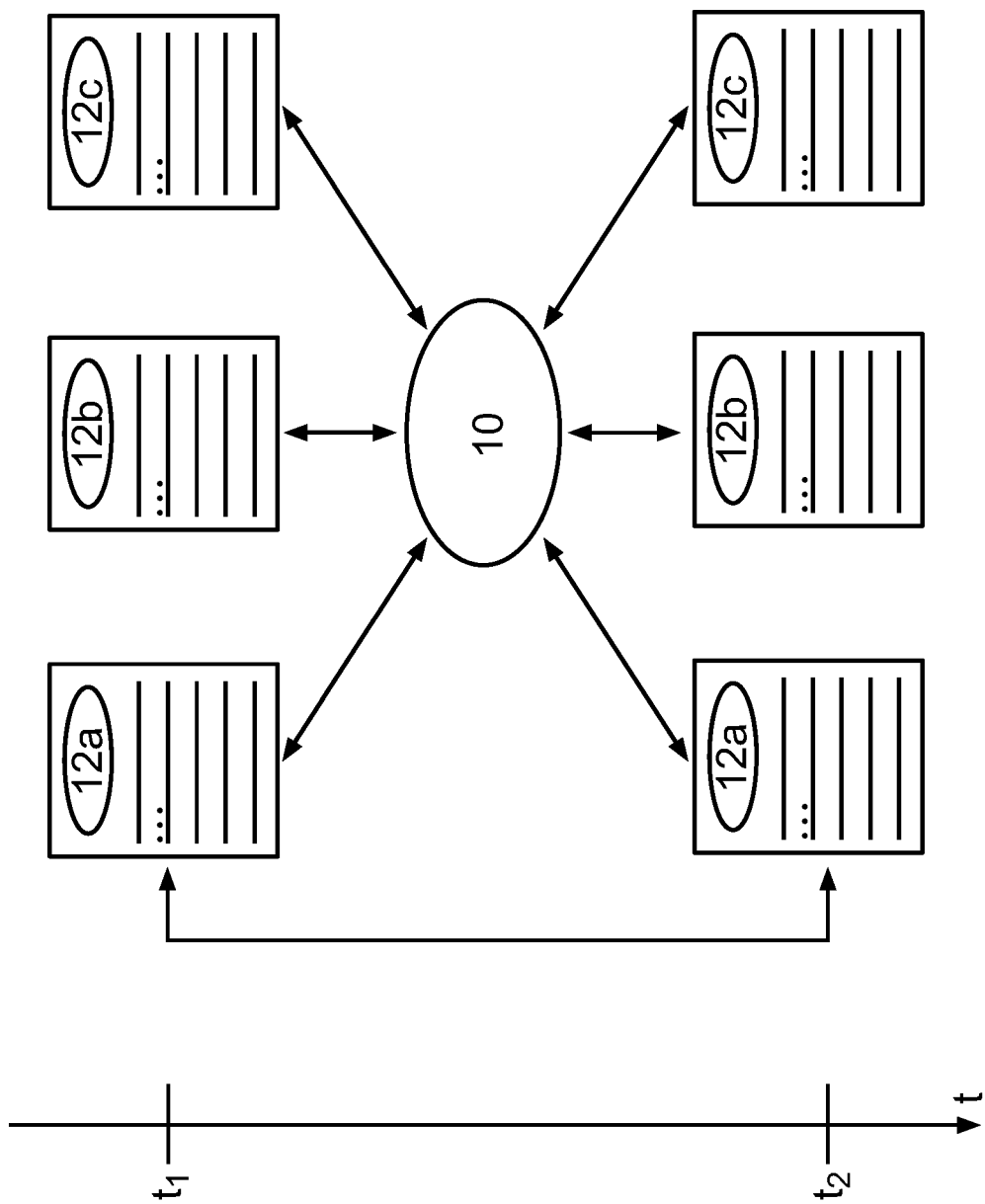
FIG. 3 shows a schematic representation of vehicle-external stored operating data in relation to the vehicle components of the motor vehicle, in accordance with some embodiments.

FIG. 3 shows a schematic representation of vehicle-external stored operating data in relation to the vehicle components of the motor vehicle, in accordance with some embodiments. FIG. 3 shows in a schematic manner how the operating data are acquired in the central server apparatus. The method shown in FIG. 1 is explained in the following in conjunction with FIGS. 2 and 3.

The method for determining the respective component behavior of the individual vehicle components 12a, 12b, 12c of the motor vehicle 10 comprises a first method step S1, in which a start-up of at least one of the three vehicle components 12a, 12b, 12c of the motor vehicle 10 is detected for the first time. The detection of this start-up triggers a second method step S2, in which a component identifier for at least one vehicle component 12a, 12b, 12c put into operation is determined by means of a random generator. For example, the component identifier is an identification number or a code having a sequence of characters, such as alphanumeric characters or special characters.

At the same time, the start-up of the at least one of the three vehicle components 12a, 12b, 12c can trigger a generation of a motor vehicle identifier, which is also generated by means of the random generator. However, the motor vehicle identifier can also be generated in a vehicle-external manner, for example in the central server apparatus, by means of a further random generator.

The component identifier or the motor vehicle identifier is assigned to the respective vehicle component 12a, 12b, 12c, or to the motor vehicle 10 put into operation for the first time. Independent of a further start-up of the same vehicle component 12a, 12b, 12c, the component identifier of the respective vehicle component 12a, 12b, 12c remains assigned in an unchanged manner. The motor vehicle identifier can also remain assigned in an unchanged manner to the motor vehicle 10 for a further start-up of a further vehicle component 12a, 12b, 12c for the first time. However, the motor vehicle identifier can also be newly generated by the random generator at each further start-up of a further vehicle component 12a, 12b, 12c, for the first time, in such a manner that the motor vehicle 10 with each different configuration of installed vehicle components 12a, 12b, 12c is assigned to a different motor vehicle identifier.

In a third method step S3, operating data of the individual vehicle components 12a, 12b, 12c of the motor vehicle 10 are collected. For this purpose, an operating performance, a usage behavior, an operating temperature and/or an operating time of the respective vehicle components 12a, 12b, 12c can be registered as operating data. The operating data are assigned to the component identifier associated with the vehicle component 12a, 12b, 12c on which the operating data were registered. Simultaneously the operating data of all vehicle components 12a, 12b, 12c of the motor vehicle 10 can also be assigned to the motor vehicle identifier. In this manner, each data set of the operating data which is registered in a vehicle-internal manner can comprise the component identifier and/or the motor vehicle identifier. The operating data are therefore always acquired in relation to the component identifier and/or the motor vehicle identifier.

In a fourth method step S4, the component behavior of a respective vehicle component 12a, 12b, 12c is determined based on the operating data assigned to the respective vehicle component 12a, 12b, 12c via the component identifier. This can be carried out in the central server apparatus in a vehicle-external manner. For this purpose, as shown in FIG. 3, individual data sets are received from the respective vehicle components 12a, 12b, 12c or from the motor vehicle 10 and stored in a database. As shown here, at a first time t1, a time of registering or receiving the data set, the data set is stored with the corresponding component identifier of the respective vehicle component 12a, 12b, 12c, in which the operating data within the respective data set are registered. At a further time t2 further data sets of the same vehicle component 12a, 12b, 12c can be registered or received. These are also stored with the respective component identifier. Furthermore, all data sets of all vehicle components 12a, 12b, 12c of the motor vehicle 10 are stored with an assignment to the motor vehicle identifier of the motor vehicle 10. Therefore, a relation can be established to each other between the individual data sets of a respective vehicle component 12a, 12b, 12c, which were acquired at different times t. At the same time, however, a relation between the individual data sets of different vehicle components 12a, 12b, 12c is possible via the common motor vehicle identifier. Thus an evaluation of the respective component behavior of a vehicle component 12a, 12b, 12c as a function of time as well as a function of further vehicle components 12a, 12b, 12c of the motor vehicle 10 can be carried out. Since the stored respective component identifiers in question or motor vehicle identifiers have been created by means of a random generator, it is not possible to establish a relation between the stored operating data or data sets and a specific person or motor vehicle. The acquisition of the operating data is therefore anonymous.

Overall, the examples show how vehicle-related operating data can be stored in an anonymous, vehicle-external manner and consulted for an evaluation of, for example, the component behavior of a vehicle component of a motor vehicle.

The invention claimed is:

1. A method for determining a component behavior of a vehicle component of a motor vehicle, the vehicle component being one of a plurality of vehicle components, the method comprising:
    registering a start-up of the vehicle component for a first time;
    in response to the registering of the start-up of the vehicle component for the first time, generating, at the motor vehicle, an assigned component identifier of the vehicle component, wherein the assigned component identifier comprises a sequence of a predetermined number of characters, wherein each character of the assigned component identifier is generated by a random generator;
    generating, at the motor vehicle, a motor vehicle identifier assigned to the motor vehicle, wherein the motor vehicle identifier comprises a sequence of a predetermined number of characters, wherein each character of the motor vehicle identifier is generated by the random generator;
    collecting, at the motor vehicle, operating data of the vehicle component;
    assigning, at the motor vehicle, the operating data to the assigned component identifier;
    assigning, at the motor vehicle, the operating data to the motor vehicle identifier; and
    sending, from the motor vehicle to a vehicle-external evaluation apparatus, the operating data of the vehicle component, the assigned component identifier, and the motor vehicle identifier of the motor vehicle for determining component behavior of the vehicle component by the vehicle-external evaluation apparatus based on the operating data assigned to the assigned component identifier and the motor vehicle identifier.

2. The method of claim 1, further comprising maintaining a value of the assigned component identifier unchanged for the vehicle component over a lifespan of the vehicle component.

3. The method of claim 1, further comprising maintaining a value of the motor vehicle identifier unchanged over a lifespan of the motor vehicle independently of the start-up of the vehicle component, independently of a turning off of the motor vehicle, or independently of a repeated start-up of the motor vehicle.

4. The method of claim 1, further comprising creating a new value of the assigned component identifier at each start-up of the vehicle component for the first time.

5. The method of claim 1, wherein the component behavior comprises at least one of an operating performance, an operating state, or a usage pattern of the vehicle component.

6. A motor vehicle comprising:
    a random generator;
    a vehicle component of a plurality of vehicle components for the motor vehicle, the motor vehicle being configured to:
    register a start-up of the vehicle component for a first time;

create a component identifier of the vehicle component comprising a sequence of a predetermined number of characters for the vehicle component, wherein each character of the component identifier is generated by the random generator;

generate a motor vehicle identifier assigned to the motor vehicle in a vehicle-internal manner after start-up of the vehicle component for the first time, wherein the motor vehicle identifier comprises a sequence of a predetermined number of characters, wherein each character of the motor vehicle identifier is generated by the random generator;

collect operating data of the vehicle component;

assign the operating data to the component identifier;

assign the operating data of the vehicle component to the motor vehicle identifier; and send the operating data of the vehicle component, the component identifier, and the motor vehicle identifier of the motor vehicle to a vehicle-external evaluation apparatus for determining component behavior of the vehicle component by the vehicle-external evaluation apparatus based on the operating data assigned to the component identifier and the motor vehicle identifier.

7. The motor vehicle of claim 6, wherein the vehicle component is further configured to maintain a value of the component identifier unchanged for the vehicle component over a lifespan of the vehicle component.

8. The motor vehicle of claim 6, further configured to maintain a value of the motor vehicle identifier unchanged over a lifespan of the motor vehicle independently of the start-up of the vehicle component, independently of a turning off of the motor vehicle, or independently of a repeated start-up of the motor vehicle.

9. The motor vehicle of claim 6, wherein the vehicle component is further configured to create a new value of the component identifier at each start-up of the vehicle component for the first time.

10. The motor vehicle of claim 6, wherein the component behavior comprises at least one of an operating performance, an operating state, and a usage pattern of the at least one vehicle component.

* * * * *